United States Patent
Wei et al.

(10) Patent No.: US 12,129,830 B2
(45) Date of Patent: Oct. 29, 2024

(54) ACTIVE POWER BOOSTING IN WIND POWER PLANTS

(71) Applicant: VESTAS WIND SYSTEMS A/S, Aarhus N (DK)

(72) Inventors: Mu Wei, Solbjerg (DK); Karthik Krishnan Jamuna, Trivandrum (IN); Manas Patankar, Glen Huntly (AU); Hugh McKenzie, Middle Park (AU); Jacob Quan Kidmose, Risskov (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 18/247,435

(22) PCT Filed: Sep. 21, 2021

(86) PCT No.: PCT/DK2021/050290
§ 371 (c)(1),
(2) Date: Mar. 30, 2023

(87) PCT Pub. No.: WO2022/069008
PCT Pub. Date: Apr. 7, 2022

(65) Prior Publication Data
US 2024/0003334 A1    Jan. 4, 2024

(30) Foreign Application Priority Data
Sep. 30, 2020    (DK) .............. PA 2020 70665

(51) Int. Cl.
*F03D 7/04*    (2006.01)
*F03D 7/02*    (2006.01)

(52) U.S. Cl.
CPC .............. *F03D 7/048* (2013.01); *F03D 7/02* (2013.01); *F03D 7/042* (2013.01)

(58) Field of Classification Search
CPC .......... F03D 7/0284; F03D 7/048; F03D 7/02; F03D 7/042; F05B 2270/337; F05B 2270/335
See application file for complete search history.

(56) References Cited

U.S. PATENT DOCUMENTS

| | | | |
|---|---|---|---|
| 2002/0104753 A1 | 8/2002 | Kloeppel et al. | |
| 2012/0104753 A1 | 5/2012 | Nakashima et al. | |

(Continued)

FOREIGN PATENT DOCUMENTS

| | | |
|---|---|---|
| EP | 2682601 A1 | 1/2014 |
| EP | 3314118 B1 | 8/2019 |

(Continued)

OTHER PUBLICATIONS

Danish Patent and Trademark Office, 1st Technical Examination including The Search Report and Search Opinion for Application PA 2020 70665, Dated: Apr. 7, 2021.

(Continued)

*Primary Examiner* — Woody A Lee, Jr.
*Assistant Examiner* — Eric A Lange
(74) *Attorney, Agent, or Firm* — Patterson + Sheridan, LLP

(57) ABSTRACT

Aspects of the present invention relate to a method for controlling one or more wind turbine generators. The method comprises: receiving a trigger signal, and implementing an active power boost mode during a predetermined time period in response to receiving the trigger signal. The active power boost mode comprises: disregarding further trigger signals; and generating one or more upper active power limits for each of the one or more wind turbine generators, wherein, during at least a first portion of the predetermined time period, the one or more upper active power limits are fixed at an active power boost level that is (Continued)

greater than a nominal active power level of the one or more wind turbine generators.

16 Claims, 3 Drawing Sheets

(56) References Cited

U.S. PATENT DOCUMENTS

| | | |
|---|---|---|
| 2016/0169199 A1 | 6/2016 | Beekmann et al. |
| 2018/0180024 A1 | 6/2018 | Spruce |
| 2018/0187650 A1* | 7/2018 | Byreddy ................. F03D 7/028 |

FOREIGN PATENT DOCUMENTS

| | | | | |
|---|---|---|---|---|
| WO | WO-2020088725 A1 * | 5/2020 | ............. | F03D 7/028 |
| WO | 2022069008 A1 | 4/2022 | | |

OTHER PUBLICATIONS

PCT, Notification of Transmittal of The International Search Report and The Written Opinion of The International Searching Authority, or The Declaration for Application PCT/DK2021050290 dated Dec. 13, 2021.

* cited by examiner

ACTIVE POWER BOOSTING IN WIND POWER PLANTS

TECHNICAL FIELD

The present disclosure relates to a method for controlling one or more wind turbine generators, and to a power plant controller implementing the method.

BACKGROUND

Wind turbine generators are typically limited at a maximum active power output. The maximum active power output is generally the 'rated power' of the wind turbine generator, which is a nominal value that the generator is able to produce across a relatively wide spectrum of wind speeds and without excessive mechanical loading of the generator.

In some circumstances, it is useful to increase the active power output of the generator beyond its rated power. This can be done by sustainably boosting the active power output. Sustainable boosting involves the increase of the maximum active power above the generator's original rated power but within the overall generational capacity of the generator. This type of increase is different to the so-called 'over-boost' of wind turbine generators in which the kinetic energy of the rotor of the generator is harnessed and released for a fast burst of active power output followed by a period of recovery. Instead, this sustainable boosting is achievable without requiring recovery.

While sustainable boosting alone is useful, current implementations restrict its use in particular energy markets, may cause undesirable mechanical loading of the generator, and may lead to imbalances in generation across wind power plants.

It is an aim of the present invention to address one or more of the disadvantages associated with the prior art.

SUMMARY OF THE INVENTION

According to an aspect of the present invention there is provided a method for controlling one or more wind turbine generators. The method comprises: receiving a trigger signal indicating that a trigger criteria is met and implementing an active power boost mode during a predetermined time period that begins in response to receiving the trigger signal. The active power boost mode comprises disregarding further trigger signals (e.g., another trigger signal); and generating one or more upper active power limits for each of the one or more wind turbine generators. During at least a first portion of the predetermined time period, the one or more upper active power limits are fixed at an active power boost level that is greater than a nominal active power level of the one or more wind turbine generators.

The active power boost level comprises a level achievable by the wind turbine generator within its physical capability and without the need for recovery. The active power boost level may be considered to be a sustainable boost level above the rated active power level. The active power boost level may comprise an active power level between the rated power level and a maximum power level achievable above a threshold wind speed.

The nominal active power level may be considered to be an original or rated nominal power—the active power level at which the turbine is operated during normal operating conditions. This is generally the rated power upon installation of the generator. The boost level may be thought of as an uprated or new nominal power, so that it is a lifting of the active power ceiling rather than a generation of excess active power above an existing maximum as in the case of what is referred to as 'overboosting'.

The one or more upper active power limits may be determined based on a number of factors. In some examples, the upper active power limit for a generator may be based on a predetermined level for the or all generators. In other examples, the upper active power limit may be generated for individual generators based on expected wear over the lifetime of the generator and other factors, including the wind speed, the maximum power that the generator can output and other factors. In some embodiments, an single upper power limit may be determined for each generator, while in other embodiments, multiple upper power limits may be determined for each generator and different time periods utilised for each limit and/or a limit chosen based on the conditions.

Through the active power boost mode and its use of trigger criteria, the provision of increased active power levels can be made responsive and capable of reacting to requirements quickly. At the same time, the fixed boost level ensures that variation in the trigger criteria does not cause fluctuating on/off cycling of the boost mode that may inflict harsh mechanical loading on a wind turbine generator. The fixing of the active power level for at least a first portion of the time period also enables the generator and, when applied to a plurality of the generators, a wider power plant, to take part in ancillary services markets for extended periods of time. For example, markets that require a specific boost in power for a determined period of time can be participated in.

The one or more upper active power limits may be fixed during the first portion by: activating a first timer for the first portion of the predetermined time period; setting the upper active power limit to the active power boost level; and preventing change to the upper active power limit while the first timer is active.

The predetermined time period may comprise a second portion that is consecutive with the first portion. During the second portion, the one or more upper active power limits may be fixed at the nominal active power level of the one or more wind turbine generators.

The one or more upper active power limits may be fixed during the second portion by: activating a second timer for the second portion of the predetermined time period; setting the upper active power limit to the nominal active power level; and preventing change to the upper active power limit while the second timer is active.

The provision of a second portion and the fixed active power limit that accompanies it further improves the properties of the method by incorporating a period of 'downtime' in which the wind turbine generator's upper limit is at its usual level. This enables the wind turbine generator to achieve the nominal level for a period before a retriggering, and thus enables better control of the generator's behaviour.

The second portion and its associated limit are also useful in adhering to rules set by operators so that the amount of boost time is kept below a threshold amount. For example, the first and second portion and the active power limits may be set so that the cumulative time of the first portions throughout a time period are below or equal to the threshold value. The second portions may be set so that they occupy the remaining time. In doing so, boosting capability is preserved and spread evenly across the time period.

The length of the first portion may be greater than the length of the second portion.

The predetermined time period may consist of the first portion and the second portion.

The method may comprise, at the end of the predetermined time period: checking the trigger criteria; and if the trigger criteria is still met, re-entering the active power boost mode; or if the trigger criteria is not met, setting the upper active power limit for the one or more wind turbine generators as the nominal active power level of the one or more wind turbine generators and awaiting a new trigger signal.

The trigger criteria may be based on one or more of measured grid frequency and electricity price.

Additionally and/or alternatively, the trigger criteria may based on a measured wind speed level. The trigger criteria may comprise a measured wind speed exceeding a wind speed threshold. The wind speed threshold may comprise a wind speed level at which the one or more wind turbine generators are capable of generating active power at the active power boost level.

The trigger criteria may comprise a desired active power level for the generators exceeding an active power output that the generators are capable of supplying at the nominal power rating. The active power output may be based on a measured wind speed for each generator.

The active power boost level may comprise an active power level that the wind turbine generator is capable of supplying without draining stored kinetic energy in a drive-train of the generator.

A ramp rate may be applied during transitions between active power limits during the active power boost mode. In other words, as the first portion of the time period begins, the active power boost level is achieved in stages. The transition from the boost level to the original nominal level after the first portion is also achieved in stages. Transitioning in stages reduces overshoot in active power production by wind turbine generators, and thereby ensures that mechanical loading is preserved at a safe level.

According to another aspect of the invention, there is provided a power plant controller comprising a limit generation unit configured to perform the method described above.

The limit generation unit may comprise a first timer and a second timer.

The power plant controller may comprise a dispatcher. The limit generation unit may be configured to send generated active power limits to the dispatcher. The dispatcher may be configured to: receive active power references for a power plant comprising the plurality of wind turbines; determine active power set points for the wind turbine generators; apply the generated active power limits to the active power set point for each generator to achieve a limited active power set point; and dispatch each limited active power set pointe to its respective wind turbine generator for controlling the active power output of the wind turbine generators.

There may be provided a power plant controller comprising a limit generation unit configured to generate an upper active power limit for each of a plurality of wind turbine generators, the upper active power limits being for limiting set points for the plurality of wind turbine generators, and wherein the limit generation unit comprises one or more timers activatable in response to a trigger signal, wherein when a timer is active, the limit generation unit generates upper active power limit at a predetermined value specific to the timer for the duration of the timer.

The power plant controller described above may be combined with any of the features described above or below.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
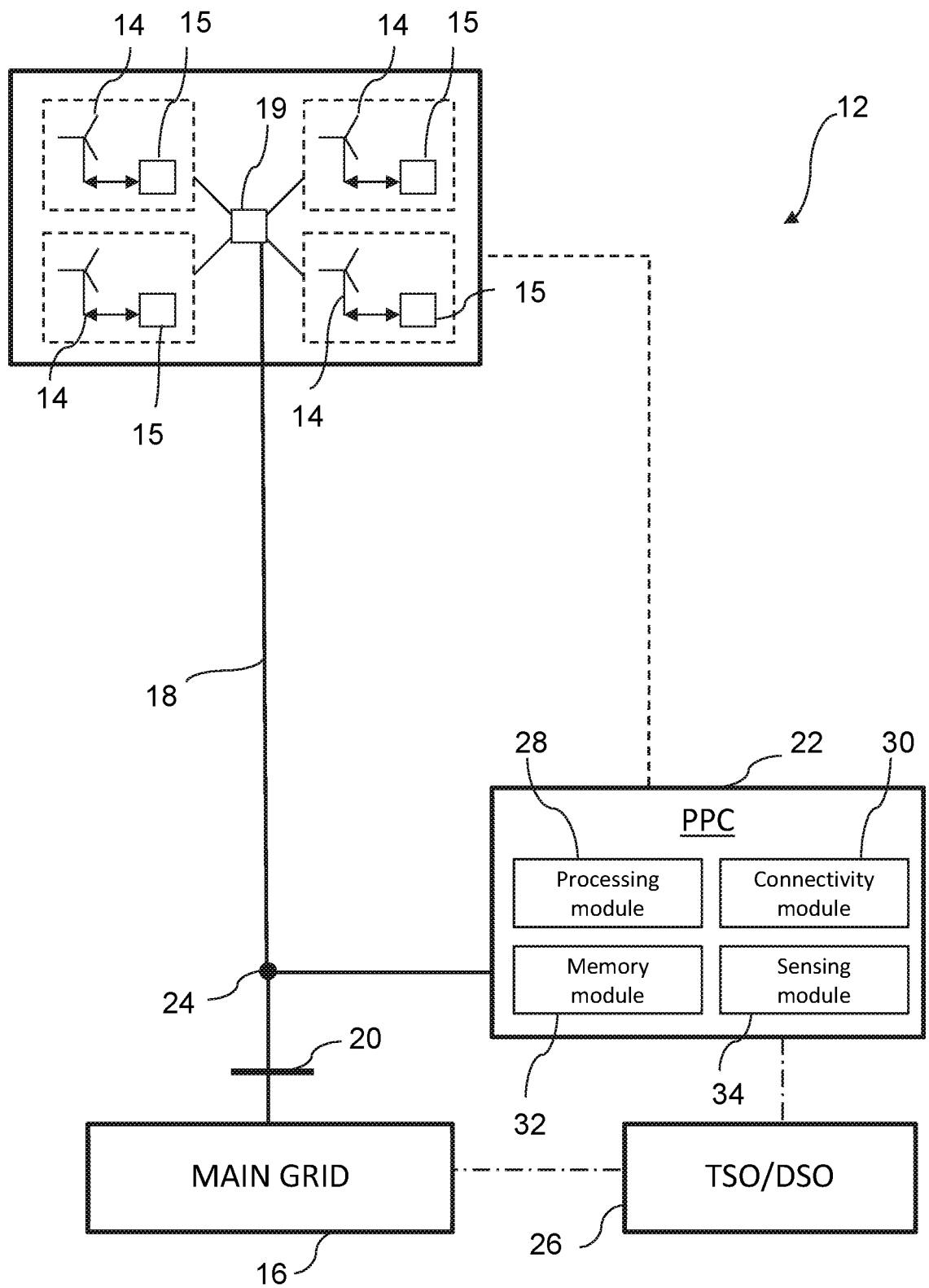
FIG. 1 shows a schematic representation of a power network.

Generally, the invention described herein is a method of controlling a wind turbine generator, and more particularly of a method in which, on the basis of a trigger signal, a maximum active power output or upper active power limit is set and fixed at a level above the original nominal or original rated power of each turbine. The maximum output is fixed for a period of time in order to prevent repetitive and unnecessary switching between different maximums, which may cause loads to be put on the turbines that would be detrimental to their lifespan. The invention may also include another fixed maximum output level at the rated power level for another period of time immediately afterwards, so that the turbines are operated at their rated power for at least a short while. This also prevents switching between different maximums too quickly FIG. 1 illustrates a typical architecture in which a wind power plant (WPP), which may also be referred to as a wind park or wind farm, is connected to a main grid as part of a wider power network. As will be understood by the skilled reader, a WPP comprises at least one wind turbine generator (WTG), and is also known as a wind park or a wind farm. A WTG is commonly referred to as a wind turbine. The examples shown are representative only and the skilled reader will appreciate that other specific architectures are possible, in relation to wind power plants, power plants for other renewable energy sources such as solar power plants, bio energy power plants, or ocean/wave/tidal energy plants, and to hybrid power plants having a combination of different types of renewable energy power plants. Thus, the invention also relates to renewable energy power plants and renewable energy generators in general, rather than being specific to wind power plants and generators as in the Figures. The components of the wind power plant and power network are conventional and as such would be familiar to the skilled reader. It is expected that other known components may be incorporated in addition to or as alternatives to the components shown and described in FIG. 1. Such changes would be within the capabilities of the skilled person.

FIG. 1 shows a power network incorporating a WPP 12 and a power plant controller 22, referred to hereafter as PPC 22. The WPP 12 includes a plurality of WTGs 14. Each of the plurality of WTGs 14 converts wind energy into electrical energy, which is transferred from the WPP 12 to a main transmission network or main grid 16, as active power and/or current, for distribution. Individual generators may each be referred to in this description as a 'unit'.

Although not illustrated in this Figure, the WPP 12 may also include compensation equipment, such as a static synchronous compensator (STATCOM) or another type of synchronous compensator, configured to provide reactive power or reactive current support as required. The WPP 12 may also include a battery energy storage system.

Each of the WTGs 14 is associated with a respective WTG controller 15. In some examples, a set of WTGs may share a single, semi-centralised WTG controller, such that there are fewer WTG controllers than WTGs. As would be understood by the skilled person, WTG controllers 15 can be considered to be computer systems capable of operating a WTG 14 in the manner prescribed herein, and may comprise multiple modules that control individual components of the WTG or just a single controller. The computer system of the WTG controller 15 may operate according to software downloaded via a communications network or programmed onto it from a computer-readable storage medium.

During normal operation of the WPP 12, the WTG controllers 15 operate to implement active and reactive current and/or power requests received from the PPC 22 to provide frequency and voltage support to the main grid 16. During extraordinary conditions, the WTG controllers 15 operate to fulfil predetermined network requirements, and also act to protect the WTGs 14 from any potentially harmful conditions.

The WPP 12 is connected to the main grid 16 (also called the main power network) by a connecting network 18. The WPP 12 and the main grid 16 are connected at a Point of Interconnection (PoI) 20, which is an interface between the WPP 12 and the main grid 16. The PoI 20 may also be referred to as the Point of Common Connection, which may be abbreviated to 'PCC' or 'PoCC'.

The WTGs 14 are connected to one another locally by local grid 19, (also called the local power network or park grid). The function of the local grid is to channel power from each of the WTGs 14 to the connecting network 18 to the main grid 16.

The Power Plant Controller (PPC) 22 is connected to the main grid 16 at a Point of Measurement (PoM) 24 and is connected to the WTG controllers 15. The role of the PPC 22 is to act as a command and control interface between the WPP 12 and the grid 16, and more specifically, between the WPP 12 and a grid operator, such as a transmission system operator (TSO) or a distribution system operator (DSO) 26. The PPC 22 is a suitable computer system for carrying out the controls and commands as described above and so incorporates a processing module 28, a connectivity module a memory module 32 and a sensing module 34. The PPC 22 may also receive information regarding the grid 16 and/or the local buses, substations and networks from an energy management system (not shown). The WPP 12 is capable of altering its power or current output in reaction to commands received from the PPC 22.

As part of its operation, the PPC 22 generates and sends dispatch signals to the WTG controllers 15. The WTG controllers 15 control the WTGs according to set points contained within the dispatch signals.

During normal operation, the PPC 22 operates in one of a number of modes. One such mode is a frequency regulation, which may also be referred to as frequency control mode, in which the PPC 22 issues dispatch signals configured to cause the WTGs 14 to supply active power to the wider network to regulate the frequency level of the power network. In another mode, the PPC 22 operates to meet a power reference provided by the TSO 26. In each of these modes, the PPC 22 supplies signals indicating active power set points to the WTGs 14 and may also dispatch signals to pause WTGs 14 or release the WTGs 14 from a paused state.

Figure 2:
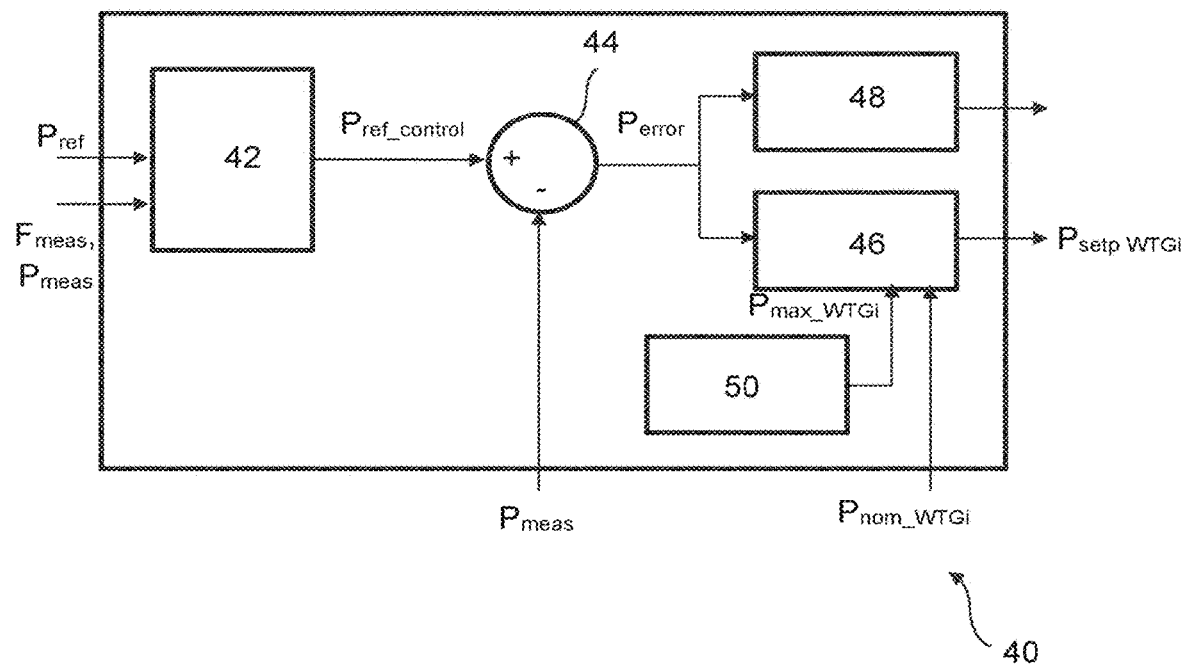
FIG. 2 shows a block diagram of an active power controller or control function for a power plant controller.

FIG. 2 shows a schematic representation of a PPC active power control unit 40, which may also be referred to as a control function, contained within the processing module 28 of the PPC 22. The control unit 40 is configured to receive or determine an active power reference value and to generate a plurality of active power set points for the WTGs 14 that together achieve the reference value. The PPC 22 subsequently dispatches these set points to the WTG controllers 15.

As shown in FIG. 2, the PPC active power control unit 40 comprises an active power controller 42. The active power controller 42 receives one or more inputs and generates an active power reference value. The inputs that the active power controller 42 receives depend upon the modes of operation that the active power controller 42 is operable in. The active power controller 42 receives an active power reference value, $P_{ref}$, from the TSO 26 where a direct active power control mode is configured. The active power controller 42 receives a measured frequency, $F_{meas}$, and a measured active power value, $P_{meas}$, where a frequency control mode is configured. In an embodiment of the active power controller 42, all these values are provided as input and a switch is operable to change the mode. The output from the active power controller 42 in each mode is a power reference value $P_{ref\_control}$.

The output active power reference value, $P_{ref\_control}$, from the active power controller 42 is received at the difference junction 44, and a difference is determined between the reference value and a measured active power value for the WPP 12. The output of the difference junction 44 is therefore an active power error value, $P_{error}$.

The error value is passed to an active power dispatcher 46. Also shown in the control unit 40 is a pause/release controller 48, which also receives the error value and determines whether to pause or release WTGs 14 to meet the error signal.

The active power dispatcher 46 receives the error value and determines a set point, $P_{setp\_WTGi}$, for each of the WTGs 14. The set point for each WTG 14 is determined based on the capacity of the WTG 14. In other words, the dispatcher 46 receives a value for the available active power of the WTG 14 and limits the set point to the maximum value.

In conventional controllers, the maximum set point value would be the rated power of the WTG 14. The rated power may be read by the dispatcher from a look-up table in a data store of rated powers for each WTG, for example.

In the present embodiments, the dispatcher 46 also receives input from a limit generation unit 50. The limit generation unit 50 determines, for each WTG 14, an upper active power limit, $P_{max\_WTGi}$, which may also be referred to as a maximum active power value or output, and provides this set of values to the dispatcher 46 for limiting the set points.

Figure 3:
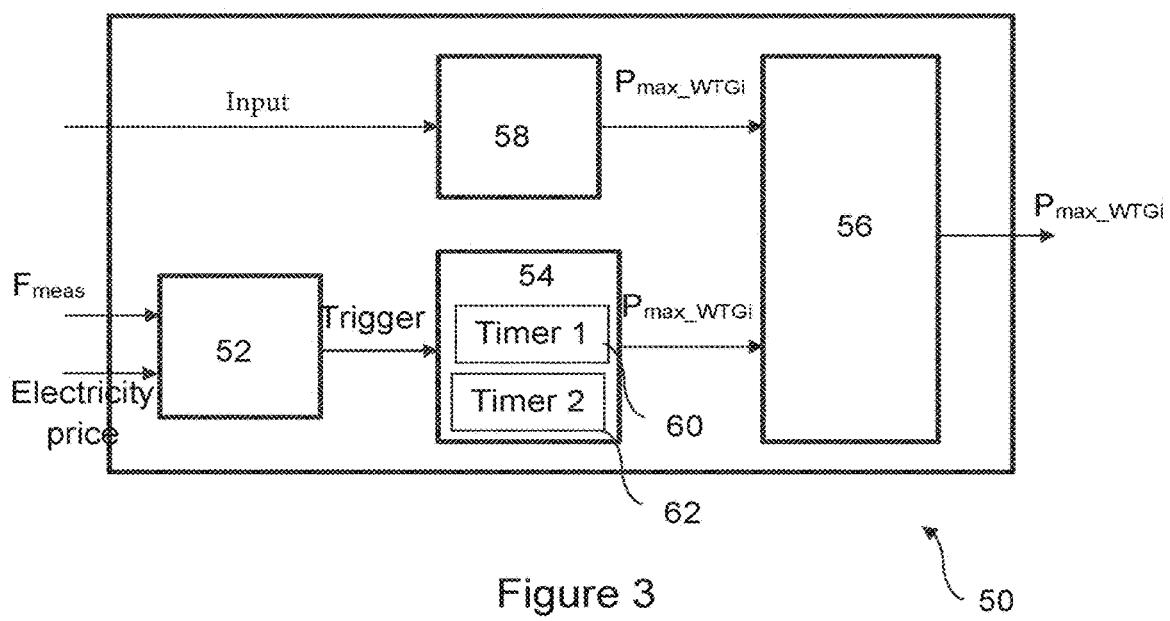
FIG. 3 shows a block diagram of a limit generation unit of the active power controller or control function of FIG. 2.
Figure 4:
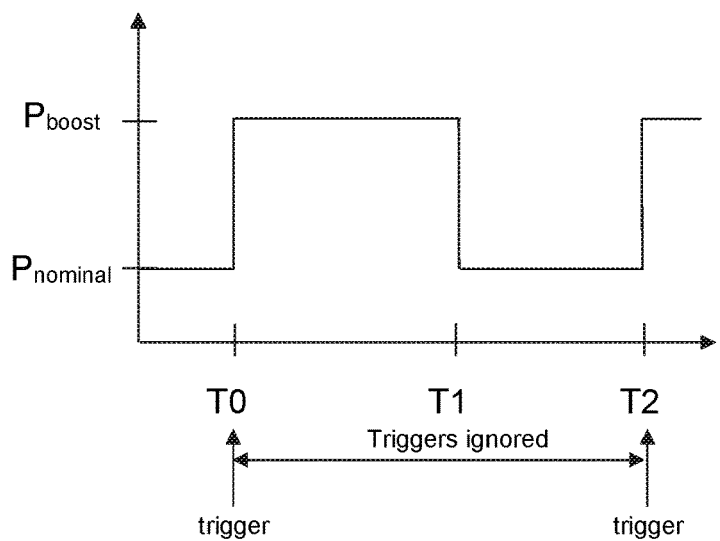
FIG. 4 shows a chart illustrating an operation of the limit generation unit of FIG. 3.
Figure 5:
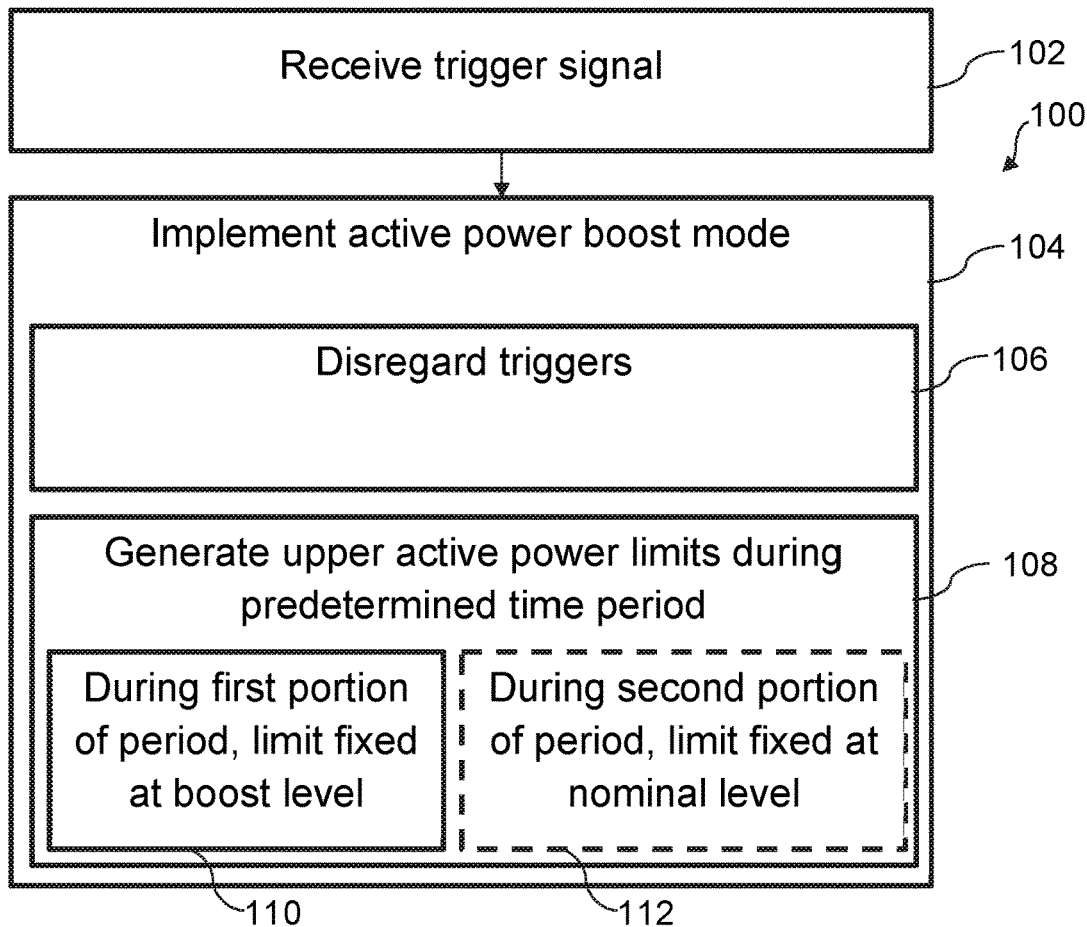
FIG. 5 shows a flow chart of a method of operating a wind turbine generator using the controller of FIG. 2.

The operation of the limit generation unit 50 is described below in relation to FIGS. 3 to 5. FIG. 3 shows a block diagram for an example limit generation unit 50, and FIG. 4 shows a chart indicating the operation of the generation unit 50. FIG. 5 provides a flow chart governing a method 100 of operation of the limit generation unit 50 and PPC 22 as a whole.

In FIG. 3, the limit generation unit 50 includes a trigger selection logic 52, a boost controller 54, a limit selection logic 56, and a limit controller 58. In general, both the boost controller 54 and the limit controller 58 generate maximum active power values for each wind turbine and input these to the selection logic 56. The selection logic 56 selects one of these maximum active power values and communicates it to the dispatcher 46.

The limit controller 58 is configured to apply predetermined active power limit rules set by the operator of the WPP 12. For example, if a particular WTG's 14 maximum active power output is curtailed due to a mechanical issue, the limit controller 58 may specify a maximum active power that is below the WTG rated power. The operation of the limit controller 58 will be familiar to the skilled person and so is not discussed in more detail in this application. The limit selection logic 56 is configured to receive the limits determined by the limit controller 58. As will be discussed below, if the limit selection logic 56 receives a limit from the limit controller 58 for a WTG 14, this limit overrides limits received from the boost controller 54 for that WTG 14.

The boost controller 54 and trigger selection logic 52 are arranged to work together to generate maximum active power values based on one or more trigger criteria. The trigger selection logic 52 receives input measurements of triggering parameters from the WPP 12 and/or the ISO 26. In the embodiment of FIG. 3, the triggering parameters are grid frequency and electricity price. In other embodiments, additional or alternative triggering parameters may be used.

Based on the measured inputs of the triggering parameters, the trigger selection logic 52 determines if a trigger criteria is met. The trigger criteria may comprise, for example, an exceedance of a threshold value by the measured value or by an average of a plurality of measured values over a predetermined time period. In a specific example, a frequency band of between 49.5 and 50.5 Hz may be specified for a 50 Hz grid, wherein any deviation outside of the band causes the trigger criteria to be met. The trigger selection logic 52 may also be configured to only determine triggers for one of the inputs, depending upon the mode of operation of the PPC 22.

In the embodiment of FIG. 3, the trigger criteria may be considered to comprise a wind speed component. That is, that the trigger selection logic 52 also receives a measured wind speed as an input. The measured wind speed is compared against a threshold wind speed. The trigger selection logic 52 uses the comparison as part of the trigger criteria, and is configured to generate the trigger signal based on the trigger criteria only if the measured wind speed exceeds the threshold. In other words, the trigger criteria comprises both a wind speed check and a triggering parameter. The triggering parameter may be compared with a threshold to determine whether a criteria is met, but a trigger signal is only issued to the boost controller 54 if the wind speed is above a certain level. Accordingly, the wind speed check acts as a flag as to whether a trigger signal can be generated. By performing both of these checks, it is ensured that the boost controller 54 does not unnecessarily permit boosting of the active power without adequate wind speeds.

In other embodiments, the trigger criteria may comprise only the wind speed check, or a combination of a number of different triggering parameters. The trigger criteria is issued for the WPP 12 as a whole in the above embodiments, although in other embodiments, triggers may be specific to a subset of WTGs 14.

If the trigger criteria is met, the trigger selection logic 52 generates a trigger signal which is communicated to the boost controller 54. The boost controller 54 is configured to, in response to receiving a trigger signal, implement an active power boost mode for a predetermined time period. In the active power boost mode, the boost controller 54 provides maximum active power values to the limit selection logic 56 for each WTG, which, in the absence of an overriding limit value received for the limit controller 58, sends these maximum active power values to the dispatcher 46.

As shown in FIG. 3, the boost controller 54 incorporates a first timer 60 and a second timer 62. The first timer 60 is configured to run for a first portion of the predetermined time period and the second timer 62 is configured to run for a second portion of the predetermined time period. The second portion is consecutive to the first portion, as will be described below.

The boost controller 54 activates the first timer 60 in response to receiving a trigger signal. Once the first portion of the predetermined time period is elapsed, the first timer 60 deactivates. The second timer 62 activates after the first portion has elapsed, so that the second portion is consecutive with the first portion. Therefore, the first timer 60 activates in response to the trigger signal and runs for a period of time after which it deactivates and a second timer 62 activates and runs for another period of time. Once the second portion has elapsed, the second timer 62 also deactivates.

At the beginning of each portion, i.e. when each timer activates, a maximum active power value is set. This value is fixed throughout its respective portion. Therefore, activation of a timer also activates a flag or indicator that the maximum active power value is to be set to a predetermined level and prevented from changing.

As each timer fixes the value it outputs, the boost controller 54 is configured to disregard further triggers during the predetermined time period in which the timers are running. By this, it is meant that further trigger signals (e.g., other trigger signals) may be received, or that the trigger criteria may not be met during the predetermined period but this is not recognised by the boost controller 54. Instead, during the predetermined period, and therefore while the timers are active, the boost controller 54 is not responsive to external inputs relating to triggers. This is useful where the trigger signal comprises a flag having a 1 value when the trigger criteria is met and a 0 value when the trigger criteria is not met. If the boost controller 54 receives the signal that the trigger criteria is met, i.e. the flag has a 1 value, it enters the boost mode. After this, for the predetermined time period, changes in the value associated with the flag do not have an effect on the operation of the boost controller 54.

Two timers 60, 62 are provided to enable different maximum active power levels to be communicated to the dispatcher 46. While the first timer 60 is active, the maximum active power value is fixed by the boost controller 54 at a boost level. The boost level is an active power value above the original rated or original nominal power of each WTG 14. That is, that the dispatcher 46 is permitted to generate a set point for each WTG 14 that is higher than usual. Generally, rated or nominal power of WTGs 14 is set at a level achievable by the WTG across a wide range of wind speeds, and so in higher wind speeds the WTG 14 may be generating less active power than it theoretically could. Accordingly, the capacity of the WTG 14 may be considered to be curtailed to the rated power. The boost level makes use of this effective curtailment by permitting the WTG 14 to generate power in the region above the rated power in order to provide a boost of active power from the WPP 12. An example boost level may be a 10% increase in active power above rated power, such as 2.2 MW for a 2 MW WTG.

The boost level described here is an over-rating, and should not be confused with so-called 'overboosting' of the WTG 14. Overboosting is the practice of providing a short burst of active power by draining the kinetic energy of the rotor and repurposing it as electrical power, and requires a period of recovery in which the kinetic energy is regained. Instead, the boost described here is sustainable as it can be maintained by the WTG 14 for extended periods without requiring recovery of kinetic energy.

However, sustainable boosting does increase the loads experienced by the turbine. The provision of a first timer during whose time portion the active power maximum value is fixed, the potentially damaging practice of switching the maximum value between boost and nominal levels is prevented. In order to prevent repeated triggering immediately after a boost, the second timer 62 is provided.

The second timer 62 activates at the end of the first portion, and runs for the second portion of the predetermined time period. During the second portion, the maximum active power is set to the original rated active power of the WTG 14, and so is reduced from the level set during the first portion. As with the first timer 60, while the second timer 62 is running triggers are disregarded and the maximum active power value is fixed.

In general terms, the first timer 60 is used to limit the amount of time for which the active power can be boosted, while the second timer 62 is used to limit the amount of time for which active power is not boosted.

After the second portion of the time period has elapsed, the second timer 62 deactivates and the maximum active power value remains at the rated value. At this point, the boost controller may cease communicating maximum active power values to the selection logic 56, and the dispatcher 46 may utilise only the nominal powers supplied to it to determine the maximum active power value. In this embodiment, the time period consists of the first portion and the second portion, so that at the end of the second portion, the active power boost mode is no longer active at the power plant controller.

At the end of the predetermined period, once the second timer 62 has run and deactivated, trigger signals are no longer ignored. The boost controller 54 checks to determine whether a trigger signal was received at the end of the predetermined time period or recently. If so, the active power boost mode is re-entered and the process begins again. Otherwise, the nominal or rated power is used by the dispatcher 46 as the maximum active power value.

The times for which the first and second timers 60, 62 operate, i.e. the length of the first and second portions of the predetermined time period, may be varied depending upon the desired result.

For example, it is envisaged that in embodiments where it is intended that the WTGs 14 take part in an ancillary services market, the time of operation of the first timer 60 is at least the time for the minimum ancillary service the WTGs 14 are to take place in. In some ancillary services, the time for the first portion and the first timer 60 may be at least 6 seconds or at least 5 minutes. In some examples, the time for the first timer and first portion may be between 6 seconds and 5 minutes, and in other examples, the length of the first timer may exceed 5 minutes. In some examples, the first timer may be in the region of 60 minutes long, or longer. The second timer is set to avoid immediately consecutive triggerings of the higher maximum active power value, so may be relatively short compared to the first timer. In some examples, the length of the second timer 62 is the less than or the same as the length of the first timer 60. In some examples the length of the second timer 62, and therefore the second portion is at least 6 seconds, and in others it is 10 seconds. In other embodiments, the second timer may be set to provided for a longer period, such as between 5 and 60 minutes. In some examples where frequency support is implemented, the second timer 62 may be set to 0 seconds so that the first timer 60 is allowed to re-trigger very quickly and provide continued frequency support. In this embodiment, a control module in the limit generation unit 50 may temporarily set the second timer to length zero in order to permit such frequency support.

In other examples, the two timers may be set to minimize mechanical loads. For instance, the number of times of turning on and turning off the boosting should be calculated based on the predicted wear of the WTG during boosting and relative to the WTG's expected lifetime.

In another example, the first timer is set to a period that includes at least 3 seconds to allow the WTG to enter the steady state. The duration of the timers may be used set to avoid the resonance frequency range of mechanical components within the WTG. This range is typically between 0.2 Hz and 5 Hz, and so timer durations in the range 0.2 s to are best avoided.

FIG. 4 illustrates the relationship of the timers and active power. As can be seen in FIG. 4, at time T0 a trigger signal is received. The trigger signal causes the active power boost mode to be implemented, and accordingly the first timer 60 to become active. In other words, the state of the first timer may be changed from 'off' or a 0 value to 'on' or a 1 value. The first timer 60 operates for the first portion of the time period, between the trigger time T0 and the end of the first portion T1. Between T0 and T1, which is while the first timer 60 is active, the maximum active power value is fixed to the boost level. At time T1 the first timer 60 deactivates, returning to the 'off' or 0 state, and the second timer 62 becomes active. The second timer is active for the second portion of the time period, between time T1 and T2. Between T1 and T2, which is while the second timer is active, the maximum active power value is fixed to the original nominal level. The predetermined time period is between time T0 and T2. Between times T0 and T2, trigger signals are ignored. At time T2 the second timer 62 becomes inactive and the boost controller 54 checks for a new trigger signal. If another trigger signal is received, the active power boost mode begins again. In this embodiment, at T2, another trigger signal is received, and the maximum active power value again increases and is fixed to the boost level and the first timer is active.

Although FIG. 4 illustrates the changes between nominal value and boost level for active power, a ramp rate may be implemented in some embodiments. The implementation of a ramp rate smooths the transition between different maximum active power values. The benefit of including a ramp rate is to reduce the likelihood of overshooting or undershooting on the plant active power profile, which may be seen as disturbances, due to the slow dispatching adjustment. In some examples, a maximum ramp rate may be set to prevent the power level from changing too quickly, and thereby reducing the overshoot or undershoot.

The operation of the limit generation unit and active power controller to control the WTGs 14 can be formulated as a method 100, an example of which is shown in FIG. 5.

As can be seen in FIG. 5, the method 100 begins at step 102, by receiving a trigger signal indicating that a trigger criteria is met. As noted above, the trigger signal may be received from a trigger selection logic. The trigger criteria may be based on frequency level or on electricity price. The trigger criteria may include a check of available power based on a measured or terminal wind speed measured at the generator. The available power without boosting may be compared to the desired or preferred power level for the plant and where the preferred power is greater than the available power, the trigger criteria is met. In some examples, the trigger criteria may include a direct wind speed check in which a measured wind speed is compared with a threshold, and wherein if the wind speed exceeds the threshold, the trigger signal may be generated.

At the next step 104, an active power boost mode is implemented. The active power boost mode is implemented during a predetermined time period that begins in response to receiving the trigger signal. As illustrated, the boost mode includes the steps 106, 108 of disregarding further trigger signals, and generating one or more upper active power limits for each of the one or more WTGs 14. While the disregarding of trigger signals 106 is described here as a positive step, it may be a passive action or a result of the implementation of the mode.

During at least a first portion of the predetermined time period for which the active power boost mode is implemented, the upper active power limits are fixed at an active power boost level that is greater than a nominal active power level of the WTGs 14. This may be achieved as described above using one or more timers to measure the portions of the predetermined time periods, so that while a timer is active for the first portion, the active power boost level is fixed, as illustrated in step 110. As an optional step, the method may include step 112, that during a second portion, the limit is fixed at an original nominal level. This step is optional as the first timer may be present alone, or the second timer may be set to zero seconds.

Although a single boost level and active power limit is described above, it will be appreciated that multiple boost levels and active power limits might be used depending upon the conditions. For example, the trigger signal may indicate a specific trigger criteria corresponding to a specific set of limits. Alternatively, more than one boost level may be set during the time period, so that the active power level is fixed at more than one boost level during the time period. It may be possible to move between several boost levels and limits during the first portion, so that the active power level being fixed at a level means fixing it above the lowest boost level.

It will be appreciated that various changes and modifications can be made to the present invention without departing from the scope of the present application.

The invention claimed is:

1. A method for controlling one or more wind turbine generators, comprising:
receiving a first trigger signal indicating that a trigger criteria is met;
operating the one or more wind turbine generators in an active power boost mode during a predetermined time period in response to receiving the trigger signal, wherein operating the one or more wind turbine generators in the active power boost mode comprises:
receiving a second trigger signal during the active power boost mode based on a change to the trigger criteria;
disregarding the second trigger signal; and
setting one or more upper active power limits for each of the one or more wind turbine generators, wherein, during at least a first portion of the predetermined time period, the one or more upper active power limits are fixed at an active power boost level that is greater than a nominal active power level of the one or more wind turbine generators.

2. The method of claim 1, wherein the one or more upper active power limits are fixed during the first portion by:
activating a first timer for the first portion of the predetermined time period;
setting the upper active power limit to the active power boost level; and
preventing change to the upper active power limit while the first timer is active.

3. The method of claim 1, wherein, during a second portion of the predetermined time period that is consecutive with the first portion of the predetermined time period, the one or more upper active power limits are fixed at the nominal active power level of the one or more wind turbine generators.

4. The method of claim 3, wherein the one or more upper active power limits are fixed during the second portion by:
activating a second timer for the second portion of the predetermined time period;
setting the upper active power limit to the nominal active power level; and
preventing change to the upper active power limit while the second timer is active.

5. The method of claim 3, wherein a length of the first portion is greater than a length of the second portion.

6. The method of claim 1, wherein the predetermined time period comprises the first portion and a second portion consecutive with the first portion.

7. The method of claim 1, comprising, at an end of the predetermined time period:
checking the trigger criteria; and at least one of:
if the trigger criteria is still met, re-entering the active power boost mode; or
if the trigger criteria is not met, setting the upper active power limit for the one or more wind turbine generators as the nominal active power level of the one or more wind turbine generators and awaiting a new trigger signal.

8. The method of claim 1, wherein the trigger criteria is based on one or more of measured grid frequency and electricity price.

9. The method of claim 1, wherein the trigger criteria is based on a measured wind speed level.

10. The method of claim 1, wherein the trigger criteria comprises a desired active power level for the generators exceeding an active power output that the generators are capable of supplying at the nominal power rating, wherein the active power output is based on a measured wind speed for each generator.

11. The method of claim 1, wherein the active power boost level comprises an active power level that each wind turbine generator is capable of supplying without draining stored kinetic energy in a drivetrain of the generator.

12. The method of claim 1, wherein a ramp rate is applied during transitions between active power limits during the active power boost mode.

13. A power plant controller, comprising:
a limit generation unit configured to perform an operation, comprising:
receiving a first trigger signal indicating that a trigger criteria is met; and operating one or more wind turbine generators in an active power boost mode during a predetermined time period in response to receiving the first trigger signal, wherein operating the one or more wind turbine generators in the active power boost mode comprises:

receiving a second trigger signal during the active power boost mode based on a change to the trigger criteria;

disregarding the second trigger signal; and setting one or more upper active power limits for each of the one or more wind turbine generators, wherein, during at least a first portion of the predetermined time period, the one or more upper active power limits are fixed at an active power boost level that is greater than a nominal active power level of the one or more wind turbine generators.

14. The power plant controller of claim 13, wherein the limit generation unit comprises a first timer and a second timer.

15. The power plant controller of claim 13, comprising a dispatcher, wherein the limit generation unit is configured to send generated active power limits to the dispatcher, and wherein the dispatcher is configured to:

receive active power references for a power plant comprising the one or more wind turbine generators;

determine active power set points for the wind turbine generators;

apply the generated active power limits to the active power set point for each generator to achieve a limited active power set point; and dispatch each limited active power set point to its respective wind turbine generator for controlling the active power output of the wind turbine generators.

16. A power plant, comprising:

a plurality of wind turbines; and a power plant controller communicatively coupled to the plurality of wind turbines; the power plant controller comprising a limit generation unit configured to perform an operation, comprising:

receiving a first trigger signal indicating that a trigger criteria is met; and operating a wind turbine of the plurality of wind turbines in an active power boost mode during a predetermined time period in response to receiving the first trigger signal, wherein operating the wind turbine in the active power boost mode comprises:

receiving a second trigger signal during the active power boost mode based on a change to the trigger criteria;

disregarding the second trigger signal; and setting one or more upper active power limits for the wind turbine, wherein, during at least a first portion of the predetermined time period, the one or more upper active power limits are fixed at an active power boost level that is greater than a nominal active power level of the wind turbine.

* * * * *